(12) United States Patent
Kim

(10) Patent No.: US 11,680,928 B2
(45) Date of Patent: Jun. 20, 2023

(54) METHOD OF CALCULATING SENSITIVITY INDICES FOR STRUCTURAL STIFFNESS AND VISCOUS DAMPING COEFFICIENT OF CARBON COMPOSITE MATERIAL AND METHOD OF ANALYZING DYNAMIC CHARACTERISTICS OF CARBON COMPOSITE MATERIAL BY USING SAME

(71) Applicant: PUKYONG NATIONAL UNIVERSITY INDUSTRY-UNIVERSITY COOPERATION FOUNDATION, Busan (KR)

(72) Inventor: Chan-Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 23 days.

(21) Appl. No.: 17/569,808

(22) Filed: Jan. 6, 2022

(65) Prior Publication Data

US 2023/0130209 A1 Apr. 27, 2023

(30) Foreign Application Priority Data

Oct. 26, 2021 (KR) .......... 10-2021-0143860

(51) Int. Cl.
*G01N 29/12* (2006.01)
*G01N 29/36* (2006.01)

(52) U.S. Cl.
CPC ............. *G01N 29/12* (2013.01); *G01N 29/36* (2013.01); *G01N 2291/0231* (2013.01)

(58) Field of Classification Search
CPC ........ G01N 29/12; G01N 29/36; G01N 29/04; G01N 29/22; G01N 2291/0231; G01N 2291/025; G01N 2291/028
See application file for complete search history.

(56) References Cited

U.S. PATENT DOCUMENTS

| 6,063,310 A | * | 5/2000 | Reese ...................... C09D 7/61 |
| | | | 524/451 |
| 2011/0130660 A1 | * | 6/2011 | Cloutier ............... A61B 8/5215 |
| | | | 600/438 |

FOREIGN PATENT DOCUMENTS

| KR | 10-2051746 B1 | 12/2019 |
| KR | 10-2223538 B1 | 3/2021 |

OTHER PUBLICATIONS

Kim, "Relationship between Structural Stiffness and Viscous Damping Coefficient in Reinforced Carbon Structure under Varying Carbon Fiber Angles", *Crystals* 2021, 11, 1252.

(Continued)

*Primary Examiner* — Suman K Nath
(74) *Attorney, Agent, or Firm* — Knobbe, Martens, Olson & Bear, LLP

(57) ABSTRACT

This application relates to a method of analyzing dynamic characteristics of a carbon composite material. This application also relates to a method of calculating sensitivity indices for structural stiffness and a viscous damping coefficient of a carbon composite material and a method of analyzing dynamic characteristics of a carbon composite material by using the same. Respective sensitivity indices for structural stiffness and a viscous damping coefficient according to a direction (angle) of carbon fiber for a carbon composite material are calculated. A change in the dynamic characteristics of the carbon composite material is evaluated (Continued)

through a proportional relationship between the sensitivity indices, thereby conducting a more accurate and efficient analysis.

10 Claims, 20 Drawing Sheets

(56) References Cited

OTHER PUBLICATIONS

Kim, "Sensitivity of the Viscous Damping Coefficient of Carbon Fiber in Carbon-Fiber-Reinforced Plastic with Respect to the Fiber Angle", *Crystals* 2021, 11, 781.
Korean Patent Application No. 10-21-0075856 by same applicant and inventor, filed Jun. 11, 2021, with English abstract.
Korean Patent Application No. 10-2021-0120284 by same applicant and inventor, filed Sep. 9, 2021, with English abstract.
U.S. Appl. No. 17/451,044 by same applicant and inventor, filed Oct. 15, 2021.

\* cited by examiner

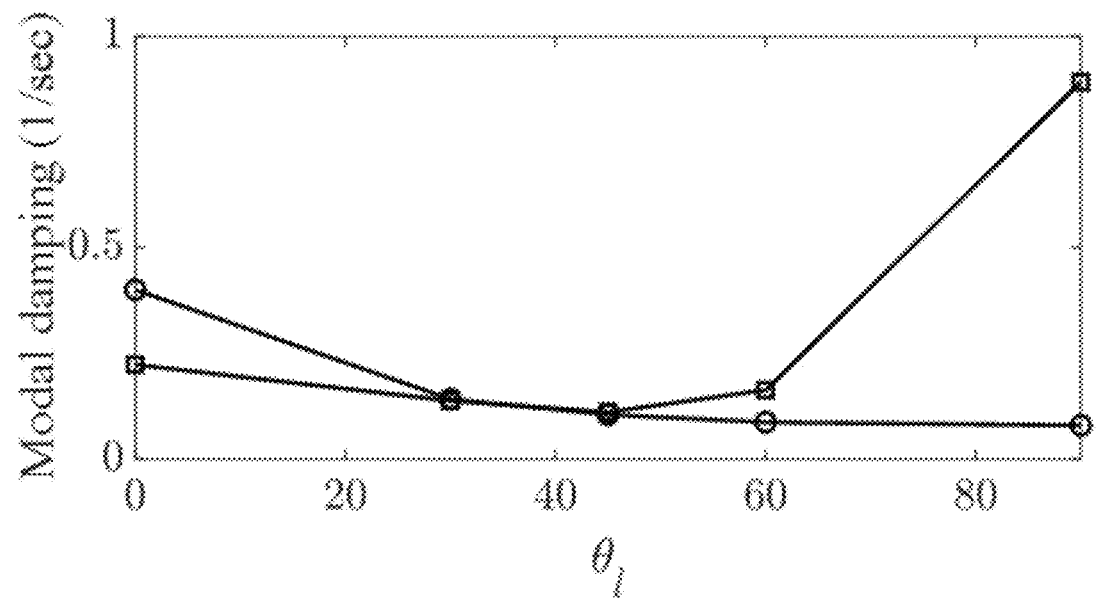

METHOD OF CALCULATING SENSITIVITY INDICES FOR STRUCTURAL STIFFNESS AND VISCOUS DAMPING COEFFICIENT OF CARBON COMPOSITE MATERIAL AND METHOD OF ANALYZING DYNAMIC CHARACTERISTICS OF CARBON COMPOSITE MATERIAL BY USING SAME

CROSS REFERENCE TO RELATED APPLICATION

The present application claims priority to Korean Patent Application No. 10-2021-0143860, filed Oct. 26, 2021, the entire contents of which is incorporated herein for all purposes by this reference.

BACKGROUND

Technical Field

The present disclosure relates to a method of analyzing dynamic characteristics of a carbon composite material.

Description of Related Technology

Recently, in various fields such as vehicle and aerospace fields, a carbon composite material that is lighter and has higher stiffness than conventional materials has been widely used.

This carbon composite material, for example, a carbon-fiber-reinforced plastics (CFRP), has enhanced physical and chemical properties, which cannot be obtained from a single material, by binding various materials with carbon fiber as needed.

SUMMARY

A sensitivity index of a viscous damping coefficient limited only to carbon fiber except a damping coefficient of a binder is proposed in the related art, but the sensitivity is a value obtained using the concept of a relative error, so a sensitivity value to variation does not change linearly and thus there is a limitation in determining the degree of sensitivity. In addition, there is a limitation that it is impossible to determine the sensitivity to a change in a resonance point varying according to a change in the carbon fiber. To solve the problem of the sensitivity index in the related art, the present disclosure is directed to providing a method of calculating sensitivity indices for structural stiffness and a viscous damping coefficient of a carbon composite material, and a method of analyzing dynamic characteristics of a carbon composite material using the same, wherein sensitivity indices for structural stiffness and viscous damping, which are generally used as the mechanical properties of a structure, are used to calculate the respective sensitivity indices for the structural stiffness and the viscous damping coefficient according to a direction (angle) of carbon fiber for the carbon composite material, thereby proposing sensitivity indices that encompass both a change in a resonance point and a change in a damping coefficient observed as the carbon fiber changes while sensitivity index values have a linear relationship.

In addition, to solve the problem of the sensitivity index in the related art where there is a limitation in determining the degree of sensitivity because a sensitivity value does not change linearly and there is a limitation that it is impossible to determine the sensitivity to a change in resonance point varying according to the change in the carbon fiber as described above, the present disclosure is directed to providing a method of calculating sensitivity indices for structural stiffness and a viscous damping coefficient of a carbon composite material and a method of analyzing dynamic characteristics of a carbon composite material by using the same, wherein considering that carbon fiber is dominant in the structural stiffness of a carbon composite material and for the viscous damping coefficient, a change in the damping coefficient related to the carbon fiber greatly affects a change in the equivalent viscous damping of the carbon composite material, the respective sensitivity indices for the structural stiffness and the viscous damping coefficient for each mode according to a change in a carbon fiber direction are calculated and a relationship between the sensitivity indices is analyzed to evaluate a change in the dynamic characteristics of the carbon composite material, thereby accurately and efficiently analyzing the dynamic characteristics of the carbon composite material through a proportional relationship between the structural stiffness and the viscous damping coefficient.

According to the present disclosure, there is provided a method of calculating sensitivity indices for structural stiffness and a viscous damping coefficient of a carbon composite material, wherein processing for calculating the sensitivity indices for the structural stiffness and the viscous damping coefficient of the carbon composite material is performed by a computer or dedicated hardware, the processing including: a data collection step of collecting various types of data including measurement values obtained through a modal test on the carbon composite material to be analyzed; an equivalent physical quantity calculation step of calculating equivalent structural stiffness and an equivalent viscous damping coefficient of the carbon composite material to be analyzed, on the basis of the respective data collected at the data collection step; an equivalent physical quantity conversion step of converting the equivalent structural stiffness and the equivalent viscous damping coefficient calculated at the equivalent physical quantity calculation step into equivalent structural stiffness and an equivalent viscous damping coefficient in a particular direction with respect to a predetermined reference direction; a sensitivity index calculation step of calculating the respective sensitivity indices according to a direction (angle) of carbon fiber by using the equivalent structural stiffness and the equivalent viscous damping coefficient resulting from conversion at the equivalent physical quantity conversion step; and an analysis step of analyzing a relationship between the structural stiffness and the viscous damping coefficient of the carbon composite material to be analyzed, by using the respective sensitivity indices calculated at the sensitivity index calculation step.

Herein, at the data collection step, the various types of the measurement values and the data including a resonance frequency, a modal damping ratio, and the viscous damping coefficient according to the direction (angle) of the carbon fiber may be collected through the modal test on the carbon composite material to be analyzed, or the measurement values and the data previously measured may be input through an input means.

Furthermore, at the equivalent physical quantity calculation step, on the basis of the respective data collected at the data collection step, the equivalent structural stiffness $\overline{k}_{eq,i}$ and the equivalent viscous damping coefficient $\overline{c}_{eq,i}$ normalized by a modal mass $m_i$ for each mode of the carbon composite material to be analyzed are expressed as respective equations for the carbon fiber and a binder using the following equations.

$$\overline{k}_{eq,i}(\theta_j) = (\omega_{n_i,C}(\theta_j))^2 + (\omega_{n_i,M}(\theta_j))^2 = \overline{k}_{C,i}(\theta_j) + \overline{k}_{M,i}(\theta_j)$$

$$\overline{c}_{eq,i}(\theta_j) = \left(\frac{1}{2\xi_{i,C}(\theta_j)\omega_{n_i,C}(\theta_j)} + \frac{1}{2\xi_{i,M}(\theta_j)\omega_{n_i,M}(\theta_j)}\right)^{-1} = \left(\frac{1}{\overline{c}_{C,i}(\theta_j)} + \frac{1}{\overline{c}_{M,i}(\theta_j)}\right)^{-1}$$

(herein, $\theta_1$ denotes a reference carbon fiber direction, $\theta_j$ denotes a particular carbon fiber angle, $\omega_n$ denotes a resonance frequency, $\xi$ denotes a modal damping ratio, and c denotes the viscous damping coefficient)

Furthermore, at the equivalent physical quantity conversion step, the equivalent structural stiffness and the equivalent viscous damping coefficient defined at the equivalent physical quantity calculation step may be expressed into the equivalent structural stiffness and the equivalent viscous damping coefficient in the particular direction with respect to the predetermined reference direction using the following equations.

$$\frac{\overline{k}_{C,i}(\theta_j)}{\overline{k}_{C,i}(\theta_1)} = 1 - \frac{\overline{k}_{eq,i}(\theta_1) - \overline{k}_{eq,i}(\theta_j)}{\overline{k}_{eq,i}(\theta_1) - \overline{k}_{eq,i}(\theta_*)}$$

$$\frac{\overline{c}_{C,i}(\theta_j)}{\overline{c}_{C,i}(\theta_1)} \approx \frac{\overline{c}_{eq,i}(\theta_j)}{\overline{c}_{eq,i}(\theta_1)}$$

(herein, $\overline{k}_{eq,i}(\theta_1)$ denotes the structural stiffness at a reference angle, $\overline{k}_{eq,i}(\theta_j)$ denotes the structural stiffness at a particular angle, $\overline{k}_{eq,i}(\theta_*)$ denotes an equivalent structural stiffness condition with the lowest stiffness, $\overline{c}_{eq,i}(\theta_1)$ denotes the equivalent viscous damping coefficient at the reference angle, and $\overline{c}_{eq,i}(\theta_j)$ denotes the equivalent viscous damping coefficient at the particular angle)

Furthermore, at the sensitivity index calculation step, on the basis of the equivalent structural stiffness and the equivalent viscous damping coefficient resulting from conversion at the equivalent physical quantity conversion step, the sensitivity index for the structural stiffness according to the direction (angle) of the carbon fiber and the sensitivity index for the viscous damping coefficient according to the direction (angle) of the carbon fiber may be calculated using the following equations.

$$I_{C,k_i}(\theta_l) = \frac{1 - \frac{\overline{k}_{eq,1}(\theta_l) - \overline{k}_{eq,i}(\theta_l)}{\overline{k}_{C,i}(\theta_1)}}{\text{norm}\left\{\sum_{l=1}^{N}\left[1 - \frac{\overline{k}_{eq,1}(\theta_l) - \overline{k}_{eq,i}(\theta_l)}{\overline{k}_{C,i}(\theta_1)}\right]\right\}}$$

$$I_{C,c_i}(\theta_l) = \frac{\frac{\overline{c}_{eq,i}(\theta_l)}{\overline{c}_{eq,i}(\theta_1)}}{\text{norm}\left\{\sum_{l=1}^{N}=\left[\frac{\overline{c}_{eq,i}(\theta_l)}{\overline{c}_{eq,i}(\theta_1)}\right]\right\}}$$

Furthermore, at the analysis step, a proportional relationship between the sensitivity index for the structural stiffness and the sensitivity index for the viscous damping coefficient may be analyzed through a graph of which the X-axis may indicate either the sensitivity index for the structural stiffness or the sensitivity index for the viscous damping coefficient calculated at the sensitivity index calculation step and the Y-axis may indicate the remaining sensitivity index Furthermore, according to the present disclosure, there is provided a computer-readable recording medium having a program recorded thereon, the program configured to cause the above-described method of calculating the sensitivity indices for the structural stiffness and the viscous damping coefficient of the carbon composite material to be executed on the computer or the dedicated hardware.

In addition, according to the present disclosure, there is provided a system for calculating sensitivity indices for structural stiffness and a viscous damping coefficient of a carbon composite material, the system including: a data collection part configured to collect various types of data including measurement values obtained through a modal test on the carbon composite material to be analyzed; and a sensitivity index calculation part configured to calculate the respective sensitivity indices for the structural stiffness and the viscous damping coefficient of the carbon composite material to be analyzed, on the basis of the data collected through the data collection part, wherein the sensitivity index calculation part is configured to calculate the respective sensitivity indices for the structural stiffness and the viscous damping coefficient by using the above-described method of calculating the sensitivity indices for the structural stiffness and the viscous damping coefficient of the carbon composite material.

In addition, according to the present disclosure, there is provided a method of analyzing dynamic characteristics of a carbon composite material, the method including: a sensitivity index calculation step of calculating respective sensitivity indices for structural stiffness and a viscous damping coefficient of the carbon composite material to be analyzed; and an analysis step of analyzing the dynamic characteristics of the carbon composite material to be analyzed, on the basis of the respective sensitivity indices calculated at the sensitivity index calculation step, wherein the sensitivity index calculation step is configured to calculate the respective sensitivity indices for the structural stiffness and the viscous damping coefficient by using the above-described method of calculating the sensitivity indices for the structural stiffness and the viscous damping coefficient of the carbon composite material.

In addition, according to the present disclosure, there is provided a system for analyzing dynamic characteristics of a carbon composite material, the system including: a sensitivity index calculation part configured to calculate respective sensitivity indices for structural stiffness and a viscous damping coefficient of the carbon composite material to be analyzed; and an analysis part configured to analyze the dynamic characteristics of the carbon composite material to be analyzed, on the basis of the respective sensitivity indices calculated by the sensitivity index calculation part, wherein the sensitivity index calculation part is configured to calculate the respective sensitivity indices for the structural stiffness and the viscous damping coefficient by using the above-described method of calculating the sensitivity indices for the structural stiffness and the viscous damping coefficient of the carbon composite material.

According to the present disclosure, provided are the method of calculating the sensitivity indices for the structural stiffness and the viscous damping coefficient of the carbon composite material and the method of analyzing the dynamic characteristics of the carbon composite material by using the same, wherein considering that carbon fiber is dominant in the structural stiffness of the carbon composite material and for the viscous damping coefficient, a change in the damping coefficient related to the carbon fiber greatly affects a change in the equivalent viscous damping of the carbon composite material, the respective sensitivity indices for the structural stiffness and the viscous damping coefficient for each mode according to a change in the carbon fiber direction are calculated. Accordingly, sensitivity indices that encompass both a change in a resonance point and a change in a damping coefficient observed as the carbon fiber changes while the sensitivity index values have a linear relationship can be proposed.

In addition, according to the present disclosure, provided are the method of calculating the sensitivity indices for the structural stiffness and the viscous damping coefficient of the carbon composite material and the method of analyzing the dynamic characteristics of the carbon composite material by using the same, wherein as described above, the respective sensitivity indices for the structural stiffness and the viscous damping coefficient according to the direction (angle) of the carbon fiber for the carbon composite material are calculated, so that sensitivity indices that encompass both a change in a resonance point and a change in a damping coefficient observed as the carbon fiber changes while the sensitivity index values have a linear relationship can be proposed. Accordingly, it is possible to solve the problem of the sensitivity index in the related art where there is a limitation in determining the degree of sensitivity because a sensitivity value does not change linearly and there is a limitation that it is impossible to determine the sensitivity to a change in resonance point varying according to the change in the carbon fiber.

In addition, according to the present disclosure, provided are the method of calculating the sensitivity indices for the structural stiffness and the viscous damping coefficient of the carbon composite material and the method of analyzing the dynamic characteristics of the carbon composite material by using the same, wherein as described above, by using the sensitivity indices for the structural stiffness and the viscous damping coefficient that encompass both a change in a resonance point and a change in a damping coefficient according to a change in the carbon fiber and have a linear relationship, a proportional relationship between the sensitivity indices is analyzed to evaluate a change in the dynamic characteristics of the carbon composite material. Accordingly, the dynamic characteristics of the carbon composite material can be analyzed more accurately and efficiently than in the conventional methods.

BRIEF DESCRIPTION OF THE DRAWINGS

The above and other objectives, features, and other advantages of the present disclosure will be more clearly understood from the following detailed description when taken in conjunction with the accompanying drawings.

FIGS. 2A and 2B are diagrams illustrating results of measuring changes in the viscous damping coefficient of a carbon composite material.

DETAILED DESCRIPTION

Figure 1A:
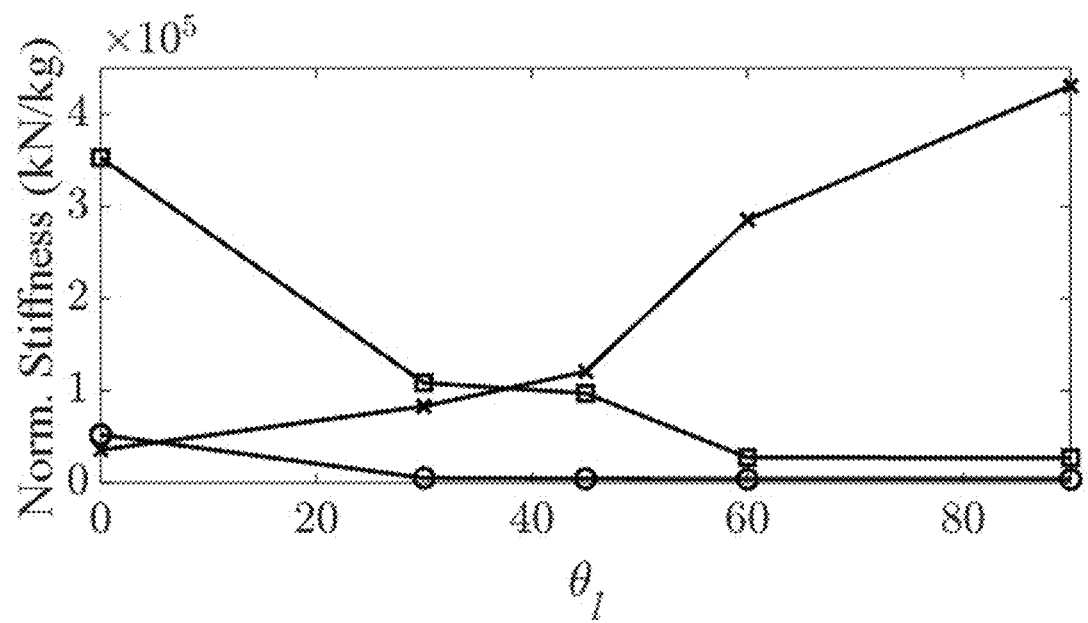
FIGS. 1A and 1B are diagrams illustrating results of measuring changes in the structural stiffness of a carbon composite material.

A sensitivity index of a viscous damping coefficient limited only to carbon fiber except a damping coefficient of a binder is proposed in the related art, but the sensitivity is a value obtained using the concept of a relative error, so a sensitivity value to variation does not change linearly and thus there is a limitation in determining the degree of sensitivity. In addition, there is a limitation that it is impossible to determine the sensitivity to a change in a resonance point varying according to a change in the carbon fiber. To solve the problem of the sensitivity index in the related art, the present disclosure relates to a method of calculating sensitivity indices for structural stiffness and a viscous damping coefficient of a carbon composite material, and a method of analyzing dynamic characteristics of a carbon composite material using the same, wherein sensitivity indices for structural stiffness and viscous damping, which are generally used as the mechanical properties of a structure, are used to calculate the respective sensitivity indices for the structural stiffness and the viscous damping coefficient according to a direction (angle) of carbon fiber for the carbon composite material, thereby proposing sensitivity indices that encompass both a change in a resonance point and a change in a damping coefficient observed as the carbon fiber changes while sensitivity index values have a linear relationship.

In addition, to solve the problem of the sensitivity index in the related art where there is a limitation in determining the degree of sensitivity because a sensitivity value does not change linearly and there is a limitation that it is impossible to determine the sensitivity to a change in resonance point varying according to the change in the carbon fiber as described above, the present disclosure relates to a method of calculating sensitivity indices for structural stiffness and a viscous damping coefficient of a carbon composite material and a method of analyzing dynamic characteristics of a carbon composite material by using the same, wherein considering that carbon fiber is dominant in the structural stiffness of a carbon composite material and for the viscous damping coefficient, a change in the damping coefficient related to the carbon fiber greatly affects a change in the equivalent viscous damping of the carbon composite material, the respective sensitivity indices for the structural stiffness and the viscous damping coefficient for each mode according to a change in a carbon fiber direction are calculated and a relationship between the sensitivity indices is analyzed to evaluate a change in the dynamic characteristics of the carbon composite material, thereby accurately and efficiently analyzing the dynamic characteristics of the carbon composite material through a proportional relationship between the structural stiffness and the viscous damping coefficient.

In addition, since the carbon composite material such as a carbon-fiber-reinforced plastic (CFRP) is a result of binding different materials, the physical properties vary greatly according to the structure or the types of materials. Therefore, a carbon composite material having characteristics appropriate for the design purpose and use must be used. To this end, it is very important to accurately determine the mechanical and physical properties of a carbon composite material to be used.

In addition, in order to analyze the damping properties that greatly affect the durability of a carbon composite material, methods using a damping coefficient or a modal damping ratio measured in a time domain or a frequency domain through a modal test, or using a sensitivity index have been proposed in the related art.

Herein, in the related art, as an example of the method using a sensitivity index to analyze the physical properties of a carbon composite material, there is "DEVICE FOR ANALYZING SENSITIVITY OF OBJECT USING FREQUENCY RESPONSE AND ANALYZING METHOD USING THE SAME" as disclosed in Korean Patent No. 10-2223538.

More specifically, Korean Patent No. 10-2223538 discloses a sensitivity analyzing device using frequency response and an analyzing method using the same, wherein the sensitivity analyzing device includes: a vibration exciter configured to set a vibration exciting pattern by control and apply a physical force to one face of a test object according to the vibration exciting pattern; a first sensor in contact with the one face of the test object to measure the physical force applied to the test object by the vibration exciter; a second sensor in contact with an opposite face of the test object to collect a vibration of the test object caused by the physical force; and a sensitivity analyzer configured to control the vibration exciter to set the vibration exciting pattern, convert the physical force signal measured by the first sensor and the vibration signal collected by the second sensor in responses to the vibration exciting pattern into frequency domain signals to calculate a frequency response function of the test object, and calculate a sensitivity index of the test object to a physical external variable, on the basis of the frequency response function. The sensitivity of the object having the orientation in an internal structure is calculated considering the orientation as well as various external force patterns, such that the physical properties of the object can be accurately analyzed.

In addition, in the related art, as another example of the method using a sensitivity index to analyze the physical properties of a carbon composite material, there is "METHOD OF ANALYZING DAMPING PROPERTIES OF CARBON COMPOSITE MATERIAL BY USING VISCOUS DAMPING COEFFICIENT OF CARBON FIBER AND SYSTEM FOR ANALYZING DAMPING PROPERTIES OF CARBON COMPOSITE MATERIAL BY USING THE SAME" as disclosed in Korean Patent Application No. 10-2021-0120284.

More specifically, Korean Patent Application No. 10-2021-0120284 discloses a method of analyzing damping properties of a carbon composite material by using a viscous damping coefficient of carbon fiber, wherein processing to analyze the damping properties of the carbon composite material by using the viscous damping coefficient of the carbon fiber is performed by a computer or dedicated hardware. The processing includes: a data collection step to collect various types of data including each modal parameter measured through a modal test on a carbon composite material to be analyzed; a conversion step to convert a value of a viscous damping coefficient of the carbon composite material collected at the data collection step into a mass-normalized equivalent viscous damping coefficient; an extraction step to extract only the viscous damping coefficient of the carbon fiber from the equivalent viscous damping coefficient defined at the conversion step; a sensitivity index calculation step to calculate a sensitivity index according to the direction (angle) of the carbon fiber by using the viscous damping coefficient of the carbon fiber extracted at the extraction step; and an analysis step to analyze the damping properties of the carbon composite material on the basis of the sensitivity index obtained at the sensitivity index calculation step. The sensitivity index is derived by separating the value of the viscous damping coefficient of the carbon fiber, which has a direct effect depending on the direction of the carbon fiber, from the measurement data of the modal damping ratio so that a change in the damping properties of the carbon composite material according to the direction of the carbon fiber is accurately analyzed physically.

As described above, various technologies for analyzing the physical properties of a carbon composite material by using a sensitivity index have been proposed in the related art, but the technologies in the related art have the following limitations.

That is, as disclosed in Korean Patent No. 10-2223538, in the related art, the technologies for analyzing the damping properties of a carbon composite material by using a modal damping ratio obtained through a modal test and by using a sensitivity index have been proposed. In general, a carbon composite material has a structure in which carbon fiber and a binding matrix for binding the carbon fiber are very tightly bound, so the modal damping ratio obtained through the modal test on the carbon composite material includes the modal properties of both the carbon fiber and the binder. Therefore, the conventional methods of analyzing the damping properties of a carbon composite material by using a modal damping ratio has a problem in that an error occurs in a result of a sensitivity analysis due to a modal value of a binder that does not change in a differentiation process for the sensitivity analysis.

In addition, to solve the problem, Korean Patent Application No. 10-2021-0120284 proposes a sensitivity index in the form of a relative error in a carbon fiber direction of interest compared to a reference carbon fiber direction on the assumption that viscous coefficients of carbon fiber and a binder are combined in parallel. However, the sensitivity index is a value obtained using the concept of a relative error, so a sensitivity value to variation does not change linearly and thus there is a limitation in determining the degree of sensitivity. Furthermore, there is a limitation that it is impossible to determine the sensitivity to a change in a resonance point varying according to a change in the carbon fiber.

Therefore, in order to solve the limitations of the sensitivity index and the methods of analyzing the physical properties of a carbon composite material by using the sensitivity index in the related art as described above, it is preferable to propose a sensitivity index of the new frame and a method of analyzing the physical properties of a carbon composite material by using the sensitivity indices that encompass both a change in a resonance point and a change in a damping coefficient observed as the carbon fiber changes while sensitivity index values have a linear relationship. However, a device or method that satisfies all such requirements has not yet been proposed.

The foregoing is intended merely to aid in the understanding of the background of the present disclosure, and is not intended to mean that the present disclosure falls within the purview of the related art that is already known to those skilled in the art.

Hereinafter, a method of calculating sensitivity indices for the structural stiffness and the viscous damping coefficient of a carbon composite material and a method of analyzing dynamic characteristics of a carbon composite material by using the same according to a detailed embodiment of the present disclosure will be described with reference to the accompanying drawings.

Here, it should be noted that the following description is merely one exemplary embodiment to carry out the present disclosure, but the present disclosure is not limited to the exemplary embodiment which will be described below.

Further, it should be noted that in the following description of the exemplary embodiment of the present disclosure, when it is determined that a portion is the same as or similar to that of the related art or easily understood and carried out by those skilled in the art, a detailed description thereof will be omitted for simplifying the description.

That is, a sensitivity index of a viscous damping coefficient limited only to carbon fiber except a damping coefficient of a binder is proposed in the related art, but the sensitivity is a value obtained using the concept of a relative error, so a sensitivity value to variation does not change linearly and thus there is a limitation in determining the degree of sensitivity. In addition, there is a limitation that it is impossible to determine the sensitivity to a change in a resonance point varying according to a change in the carbon fiber. To solve the problem of the sensitivity index in the related art, the present disclosure relates to a method of calculating sensitivity indices for structural stiffness and a viscous damping coefficient of a carbon composite material, and a method of analyzing dynamic characteristics of a carbon composite material using the same, wherein sensitivity indices for structural stiffness and viscous damping, which are generally used as the mechanical properties of a structure, are used to calculate the respective sensitivity indices for the structural stiffness and the viscous damping coefficient according to a direction (angle) of carbon fiber for the carbon composite material, thereby proposing sensitivity indices that encompass both a change in a resonance point and a change in a damping coefficient observed as the carbon fiber changes while sensitivity index values have a linear relationship.

In addition, to solve the problem of the sensitivity index in the related art where there is a limitation in determining the degree of sensitivity because a sensitivity value does not change linearly and there is a limitation that it is impossible to determine the sensitivity to a change in resonance point varying according to the change in the carbon fiber as described above, the present disclosure relates to a method of calculating sensitivity indices for structural stiffness and a viscous damping coefficient of a carbon composite material and a method of analyzing dynamic characteristics of a carbon composite material by using the same, wherein considering that carbon fiber is dominant in the structural stiffness of a carbon composite material and for the viscous damping coefficient, a change in the damping coefficient related to the carbon fiber greatly affects a change in the equivalent viscous damping of the carbon composite material, the respective sensitivity indices for the structural stiffness and the viscous damping coefficient for each mode according to a change in a carbon fiber direction are calculated and a relationship between the sensitivity indices is analyzed to evaluate a change in the dynamic characteristics of the carbon composite material, thereby accurately and efficiently analyzing the dynamic characteristics of the carbon composite material through a proportional relationship between the structural stiffness and the viscous damping coefficient.

Hereinbelow, details of a method of calculating sensitivity indices for the structural stiffness and the viscous damping coefficient of a carbon composite material and a method of analyzing dynamic characteristics of a carbon composite material by using the same according to the present disclosure will be described with reference to the drawings.

That is, as described above, in Korean Patent Application No. 10-2021-0120284, titled "METHOD OF ANALYZING DAMPING PROPERTIES OF CARBON COMPOSITE MATERIAL BY USING VISCOUS DAMPING COEFFICIENT OF CARBON FIBER AND SYSTEM FOR ANALYZING DAMPING PROPERTIES OF CARBON COMPOSITE MATERIAL BY USING THE SAME", filed by the inventor of the present disclosure on 9 Sep. 2021, a sensitivity index of a viscous damping coefficient limited to carbon fiber except a damping coefficient of a binder was proposed. However, the sensitivity is a value obtained using the concept of a relative error, so a sensitivity value to variation does not change linearly and thus there is a limitation in determining the degree of sensitivity. Furthermore, there is a limitation that it is impossible to determine the sensitivity to a change in a resonance point varying according to a change in the carbon fiber.

Accordingly, the present disclosure proposes a method of evaluating the sensitivity of structural stiffness and viscous damping according to a direction of a reinforced material, taking into consideration that the structural stiffness and the viscous damping of a composite material according to the direction of the reinforced material vary. Herein, considering that the sensitivity effect according to the direction is insensitive to a binder and is significant only to the reinforced material, respective sensitivity index values of the structural stiffness and the viscous damping according to the direction of the reinforced material are proposed.

To this end, in the present disclosure, structural stiffness and viscous damping, which are generally used as the mechanical properties of a structure, are selected as parameters of interest, and the sensitivity indices of the parameters are equally expressed as the ratio of values for a carbon fiber angle to be observed with respect to a reference carbon fiber angle. Therefore, the respective sensitivity index values are expressed as variations with respect to a reference value and thus have a linear relationship.

In addition, by expressing the observation of the variation in the resonance point through the structural stiffness directly related thereto, both a change in the resonance point and a change in the damping coefficient observed as the carbon fiber changes are encompassed.

Herein, in the embodiment of the present disclosure described below, the details of the structural stiffness or viscous damping of a composite material and the processing process for calculating a sensitivity index by using the same and for analyzing the dynamic characteristics of the composite material can be appropriately configured by those skilled in the art with reference to the document in the related art such as Korean Patent Application No. 10-2021-0120284. Accordingly, in the present disclosure, it should be noted that in order to simplify the description, a detailed description of the details will be omitted which are obvious to those skilled in the art from the document in the related art as described above or which can be easily understood and implemented by those skilled in the art with reference to the document in the related art.

More specifically, referring to [Equation 1] and [Equation 2] below, [Equation 1] and [Equation 2] respectively show an equivalent structural stiffness $\bar{k}_{eq,i}$ and an equivalent viscous damping coefficient $\bar{c}_{eq,i}$ that are normalized by a modal mass $m_i$ in an i-th mode, expressed with carbon fiber, which is a reinforced material, and a binder element.

$$\bar{k}_{eq,i}(\theta_j) = (\omega_{n_i,C}(\theta_j))^2 + (\omega_{n_i,M}(\theta_j))^2 = \bar{k}_{C,i}(\theta_j) + \bar{k}_{M,i}(\theta_j) \quad \text{[Equation 1]}$$

$$\bar{c}_{eq,i}(\theta_j) = \left(\frac{1}{2\xi_{i,C}(\theta_j)\omega_{n_i,C}(\theta_j)} + \frac{1}{2\xi_{i,M}(\theta_j)\omega_{n_i,M}(\theta_j)}\right)^{-1} = \quad \text{[Equation 2]}$$

$$\left(\frac{1}{\bar{c}_{C,i}(\theta_j)} + \frac{1}{\bar{c}_{M,i}(\theta_j)}\right)^{-1}$$

Herein, in [Equation 1] and [Equation 2], $\theta_1$ denotes a reference carbon fiber direction, $\theta_j$ denotes a particular carbon fiber angle, $\omega_n$ denotes a resonance frequency, denotes a modal damping ratio, and c denotes a viscous damping coefficient.

That is, as shown in [Equation 1] and [Equation 2], in the case of the equivalent structural stiffness, the structural stiffness $\bar{k}_{C,i}(\theta_j)$ of the carbon fiber and the structural stiffness $\bar{k}_{M,i}(\theta_j)$ of the binder are in a serial connection relationship. Conversely, in the case of the equivalent viscous damping coefficient, the viscous damping coefficient $\bar{c}_{C,i}(\theta_j)$ of the carbon fiber and the viscous damping coefficient $\bar{c}_{M,i}(\theta_j)$ of the binder are in a parallel connection relationship.

In addition, using [Equation 1] and [Equation 2], the ratio of the physical quantity in a particular direction to the physical quantity in a reference direction may be expressed as the equivalent physical quantity in each measurable direction, as shown in [Equation 3] and [Equation 4].

$$\frac{\bar{k}_{C,i}(\theta_j)}{\bar{k}_{C,i}(\theta_1)} = 1 - \frac{\bar{k}_{eq,i}(\theta_1) - \bar{k}_{eq,i}(\theta_j)}{\bar{k}_{eq,i}(\theta_1) - \bar{k}_{eq,i}(\theta_*)} \quad \text{[Equation 3]}$$

$$\frac{\bar{c}_{C,i}(\theta_j)}{\bar{c}_{C,i}(\theta_1)} \approx \frac{\bar{c}_{eq,i}(\theta_j)}{\bar{c}_{eq,i}(\theta_1)} \quad \text{[Equation 4]}$$

Herein, in [Equation 3] and [Equation 4], $\bar{k}_{eq,i}(\theta_1)$ denotes the structural stiffness at a reference angle, $\bar{k}_{eq,i}(\theta_j)$ denotes the structural stiffness at a particular angle, $\bar{k}_{eq,i}(\theta_*)$ denotes an equivalent structural stiffness condition with the lowest stiffness, $\bar{c}_{eq,i}(\theta_1)$ denotes an equivalent viscous damping coefficient at the reference angle, and $\bar{c}_{eq,i}(\theta_j)$ denotes an equivalent viscous damping coefficient at the particular angle.

In addition, when the sensitivity indices according to a change in the carbon fiber direction are expressed using the relationships in [Equation 3] and [Equation 4] and the condition that only a discrete carbon fiber increase in the actual observation process is possible, the sensitivity indices are expressed as the equations related to the structural stiffness and the viscous damping coefficient, as shown in [Equation 5] and [Equation 6], respectively.

$$I_{C,k_i}(\theta_l) = \frac{1 - \frac{\bar{k}_{eq,1}(\theta_l) - \bar{k}_{eq,i}(\theta_l)}{\bar{k}_{C,i}(\theta_1)}}{\text{norm}\left\{\sum_{l=1}^{N}\left[1 - \frac{\bar{k}_{eq,1}(\theta_l) - \bar{k}_{eq,i}(\theta_l)}{\bar{k}_{C,i}(\theta_1)}\right]\right\}} \quad \text{[Equation 5]}$$

$$I_{C,c_i}(\theta_l) = \frac{\frac{\bar{c}_{eq,i}(\theta_l)}{\bar{c}_{eq,i}(\theta_1)}}{\text{norm}\left\{\sum_{l=1}^{N} = \left[\frac{\bar{c}_{eq,i}(\theta_l)}{\bar{c}_{eq,i}(\theta_1)}\right]\right\}} \quad \text{[Equation 6]}$$

Herein, to compare the respective sensitivity indices of [Equation 5] and [Equation 6], the equivalent structural stiffness and the equivalent viscous damping coefficient are directly divided by the carbon fiber direction variable θ, as shown in [Equation 7] and [Equation 8], respectively.

$$\frac{\Delta \bar{k}_{eq,i}(\theta)}{\Delta \theta} = \frac{\Delta(\omega_{n_i})^2}{\Delta \theta} = 2\omega_{n_i}\left(\frac{\Delta\omega_{n_i}}{\Delta \theta}\right) \quad \text{[Equation 7]}$$

$$\frac{\Delta \bar{c}_{eq,i}(\theta)}{\Delta \theta} = \frac{\Delta(2\omega_{n_i}\xi_i)}{\Delta \theta} = 2\left[\xi_i \frac{\Delta \omega_{n_i}}{\Delta \theta} + \omega_{n_i}\frac{\Delta \xi_i}{\Delta \theta}\right] \quad \text{[Equation 8]}$$

Therefore, using the results above and considering the discrete increment condition for the carbon fiber direction, general sensitivity indices for the structural stiffness and the viscous damping coefficient may be derived as shown in [Equation 9] and [Equation 10].

$$I_{eq,k_i}(\theta_l) = \frac{\omega_{avg,l}\frac{\Delta\omega_{n_i}}{\Delta\theta_l}}{\text{norm}\left\{\sum_{l=1}^{N}\left[\omega_{avg,l}\frac{\Delta\omega_{n_i}}{\Delta\theta_l}\right]\right\}} \quad \text{[Equation 9]}$$

$$I_{eq,c_i}(\theta_l) = \frac{\xi_{avg,l}\frac{\Delta\omega_{n_i}}{\Delta\theta_l} + \omega_{avg,l}\frac{\Delta\xi_i}{\Delta\theta_l}}{\text{norm}\left\{\sum_{l=1}^{N}\left[\xi_{avg,l}\frac{\Delta\omega_{n_i}}{\Delta\theta_l} + \omega_{avg,l}\frac{\Delta\xi_i}{\Delta\theta_l}\right]\right\}} \quad \text{[Equation 10]}$$

Herein, the sensitivity index value shown in [Equation 10] is the same as that proposed in the existing patent (Korean Patent Application No. 10-2021-0120284) filed by the inventor of the present disclosure. The sensitivity index values of [Equation 5] and [Equation 6] indicate the variation limited to the carbon fiber except the binder element that has little effect according to the carbon fiber direction, and the variation in the physical quantity in a particular direction with respect to the reference carbon fiber direction is linearly represented.

Conversely, [Equation 9] and [Equation 10] show values obtained by performing direct differentiation on the carbon fiber direction variable, and the values are the sensitivity indices appropriate to observe the change in the equivalent physical quantity according to an increase in the carbon fiber angle.

Hereinbelow, a result of analyzing the relationship between the structural stiffness and the viscous damping coefficient of the carbon composite material through a plane graph will be described. In the plane graph, the sensitivity indices derived as described above are used as respective axes.

More specifically, in the present disclosure, in order to described the above-described details through an example, a carbon composite material specimen in a rectangular shape was prepared for each of the carbon fiber directions that are five directions (a 0 degree angle (reference point), a 30 degree angle, a 45 degree angle, a 60 degree angle, and a 90 degree angle), frequency response functions were obtained using an impact hammer, and then an analysis using modal parameters was conducted through a modal analysis.

That is, referring to FIGS. 1A to 2B, FIGS. 1A and 1B, and 2A and 2B are diagrams illustrating results of measuring changes in the structural stiffness and the viscous damping coefficient of the carbon composite material, respectively.

Figure 1B:
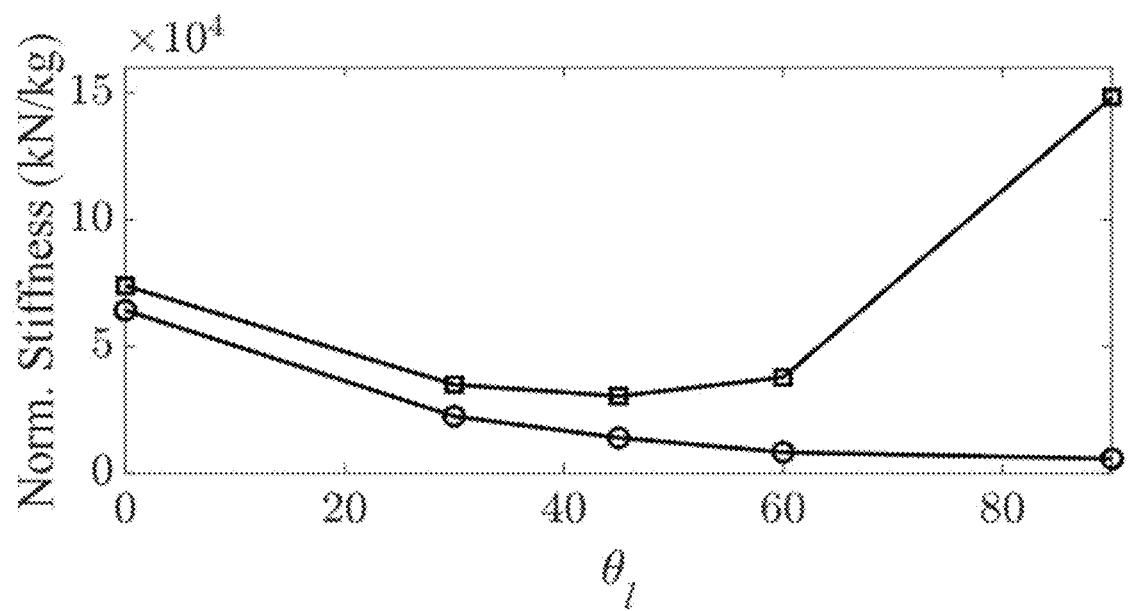

Herein, FIGS. 1A and 1B are diagrams illustrating changes in the normalized structural stiffness. FIG. 1A shows a first bending mode (denoted by -⊙-), a second bending mode (denoted by -☐-), and a third bending mode (denoted by -✶-). FIG. 1B shows a first twisting mode (denoted by -⊙-) and a second twisting mode (denoted by -☐-).

Figure 2A:
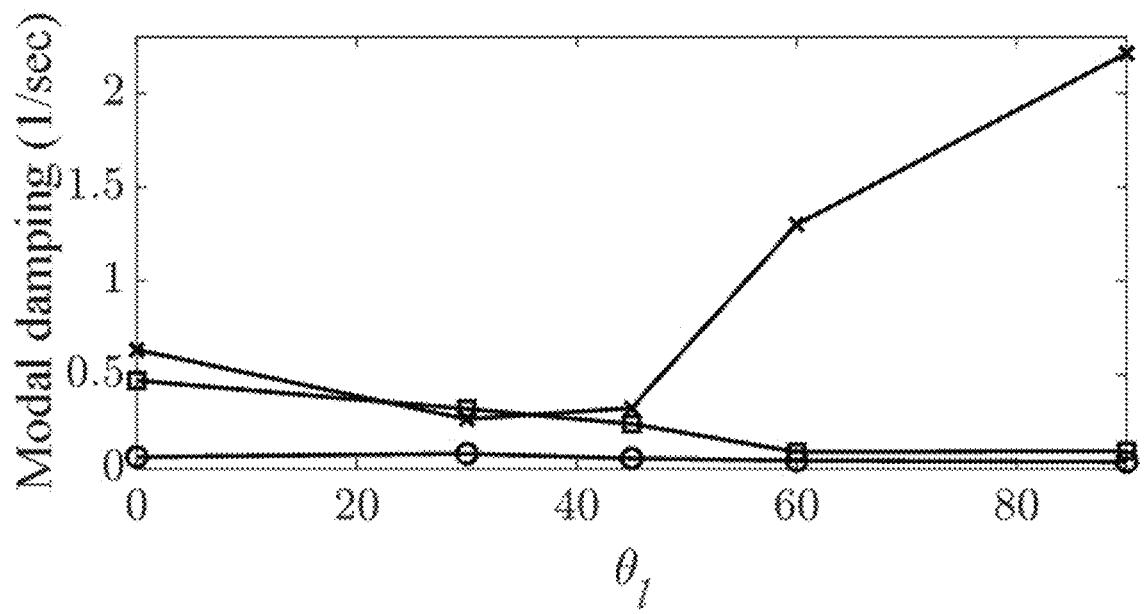

In addition, FIGS. 2A and 2B are diagrams illustrating changes in the normalized viscous damping coefficient. FIG. 2A shows the first bending mode (denoted by -⊙-), the second bending mode (denoted by -☐-), and the third bending mode (denoted by -✶-). FIG. 2B shows the first twisting mode (denoted by -⊙-) and the second twisting mode (denoted by -☐-).

In addition, referring to FIGS. 3A to 4E, FIGS. 3A to 3E, and FIGS. 4A to 4E are diagrams illustrating results of conducting a sensitivity analysis on the structural stiffness and the viscous damping coefficient of the carbon composite material on the basis of the data of the measurement results.

Figure 3A:
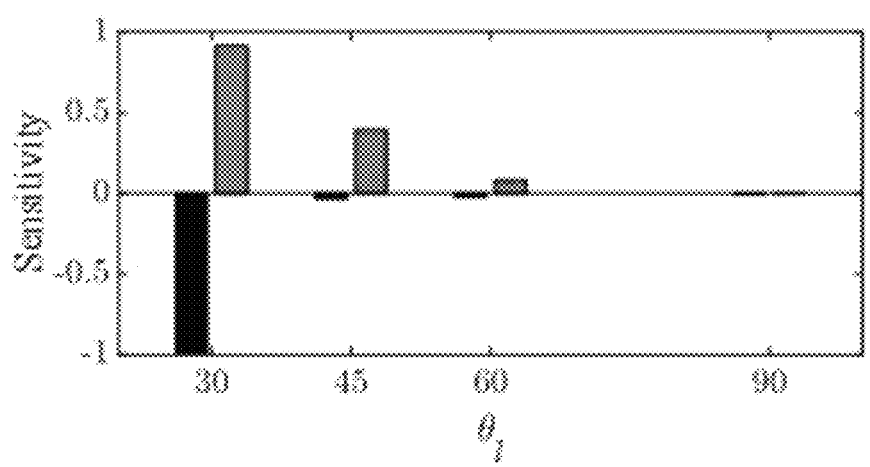
FIGS. 3A to 3E are diagrams illustrating results of conducting a sensitivity analysis on the structural stiffness of a carbon composite material.
Figure 3B:
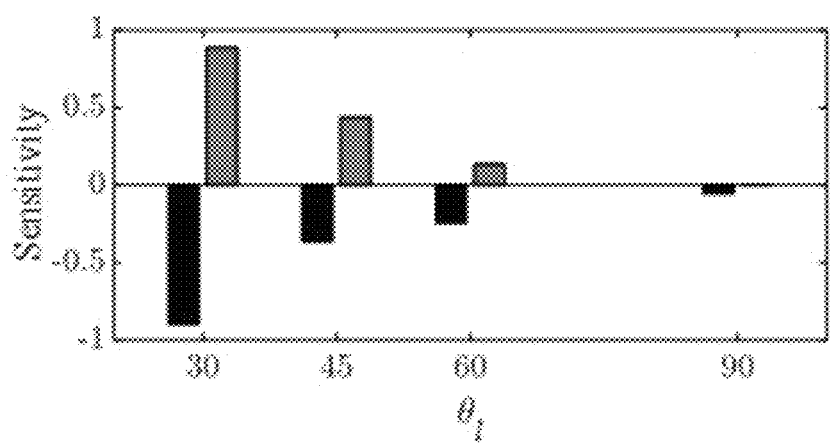
Figure 3C:
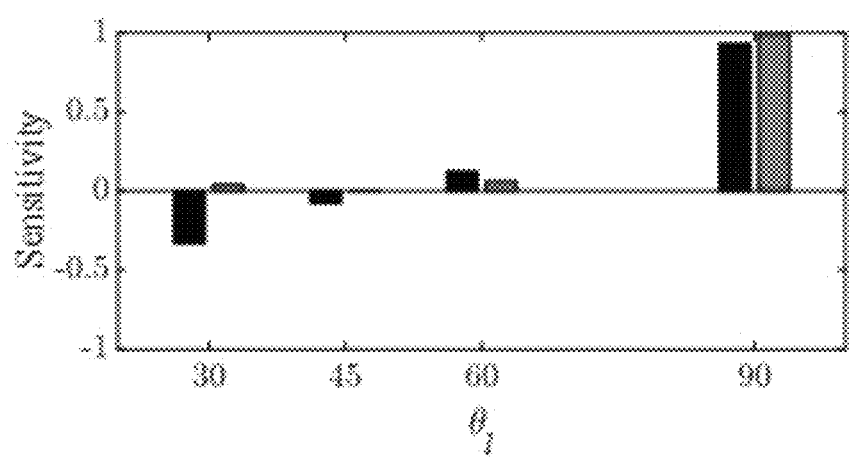
Figure 3D:
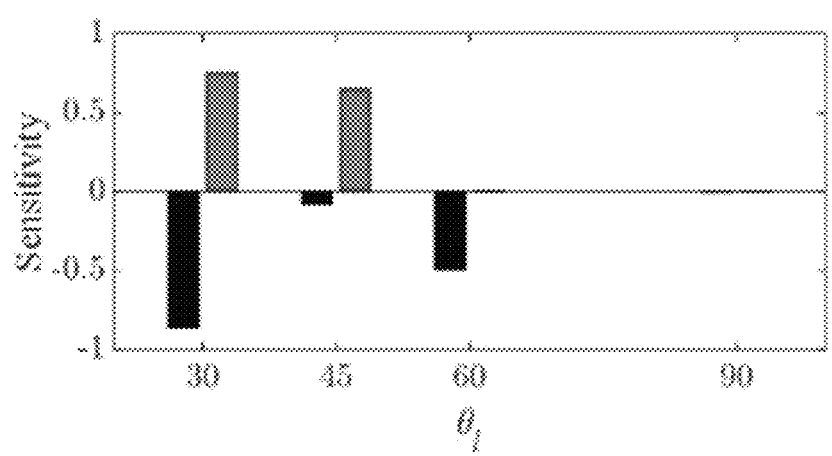
Figure 3E:
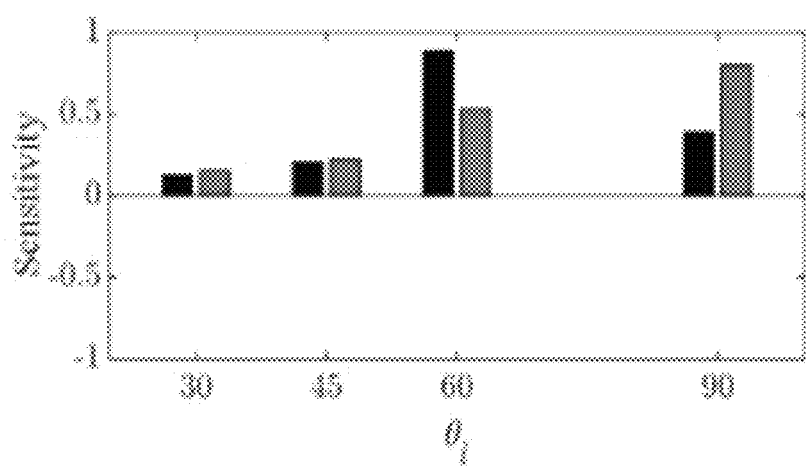

Herein, in FIGS. 3A to 3E, the black color denotes the mass-normalized equivalent structural stiffness (Equation 9), and the grey color denotes the ratio (Equation 5) of the structural stiffness at a particular angle to the structural stiffness at the reference angle. FIG. 3A shows the first bending mode, FIG. 3B shows the first twisting mode, FIG. 3C shows the second twisting mode, FIG. 3D shows the second bending mode, and FIG. 3E shows the third bending mode.

Figure 4A:
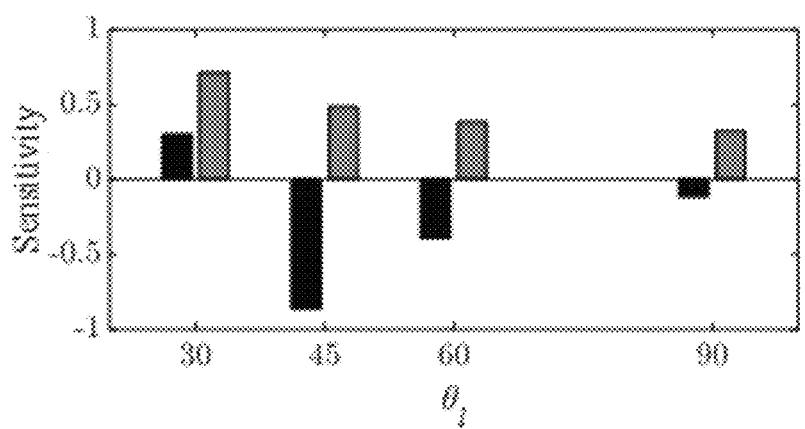
FIGS. 4A to 4E are diagrams illustrating results of conducting a sensitivity analysis on the viscous damping coefficient of a carbon composite material.
Figure 4B:
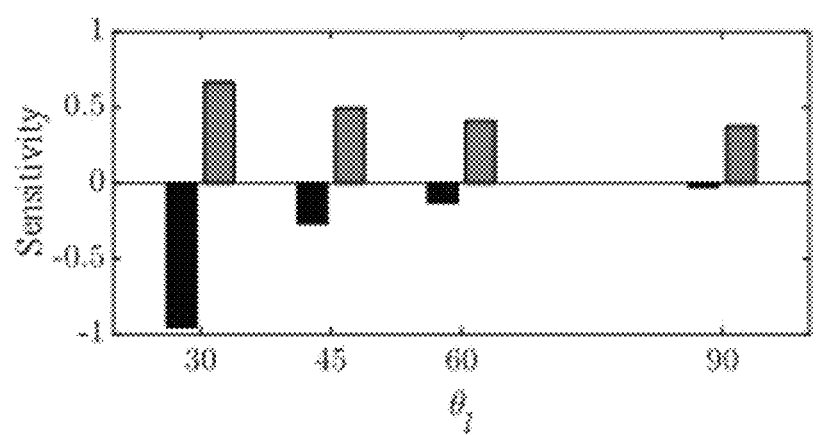
Figure 4C:
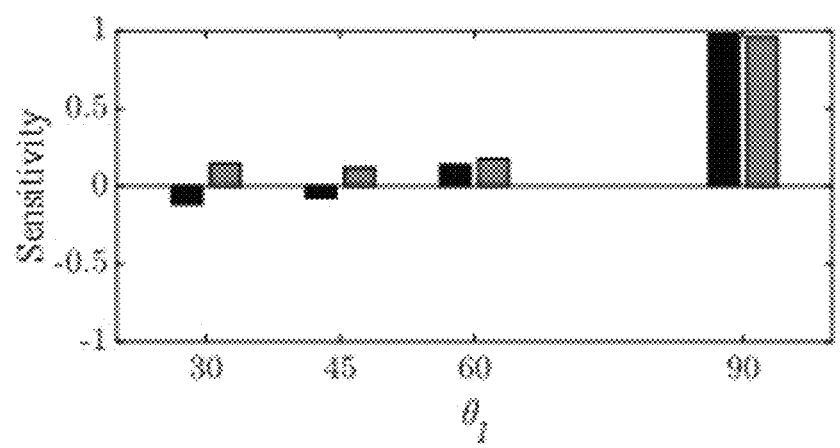
Figure 4D:
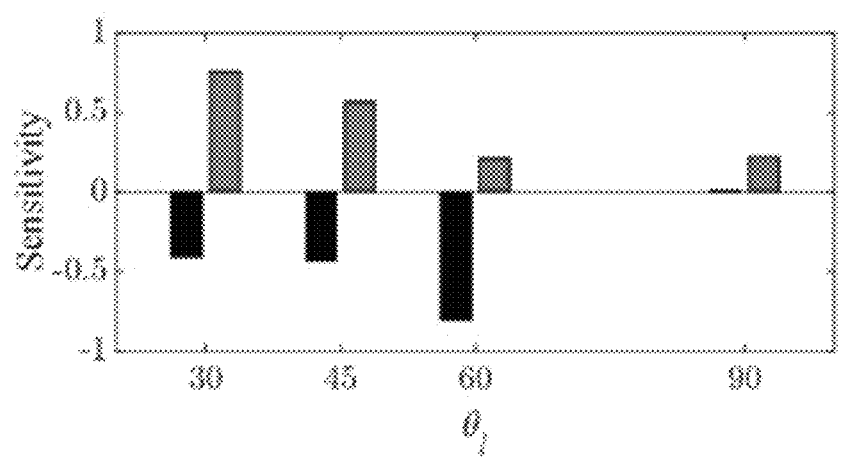
Figure 4E:
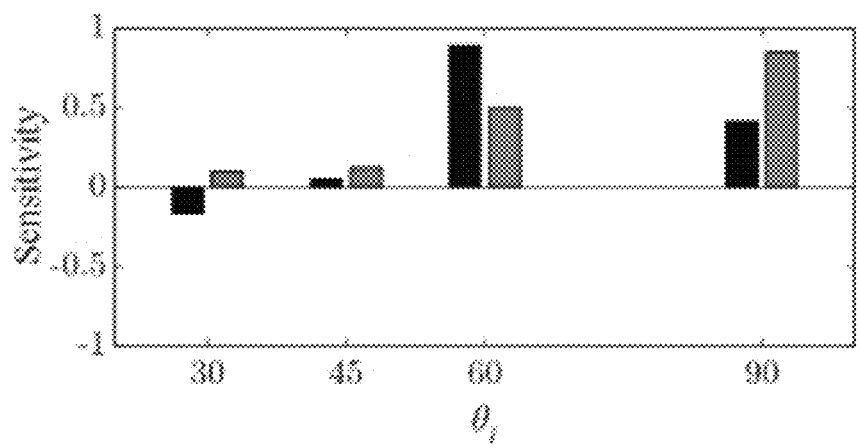

In addition, in FIGS. 4A to 4E, the black color denotes the mass-normalized equivalent viscous damping (Equation 10), and the grey color denotes the ratio (Equation 6) of the viscous damping at a particular angle to the viscous damping at the reference angle. FIG. 4A shows the first bending mode, FIG. 4B shows the first twisting mode, FIG. 4C shows the second twisting mode, FIG. 4D shows the second bending mode, and FIG. 4E shows the third bending mode.

From the above results, as a result of comparing the sensitivity related to the structural stiffness with the sensitivity related to the viscous damping coefficient, it was found that there was a difference in trend between the two sensitivities. Regarding the difference in trend, the equivalent physical quantity (black) shows a difference in a target physical quantity according to the angle change, whereas the ratio (grey) of the physical quantity at a particular angle to the physical quantity at the reference angle shows the variation with respect to the reference angle, so there is a difference.

In addition, in the former, the effect of the binder was included in the equivalent physical quantity, but in the latter, the value limited only to the carbon fiber was derived, so the difference was large.

The change in the structural stiffness of FIGS. 1A and 1B and the change in the viscous damping coefficient of FIGS. 2A and 2B may be easily determined through the sensitivity index values of [Equation 9] and [Equation 10] resulting from the direct differentiation of the respective physical quantities. However, the change in the structural stiffness and the viscous damping coefficient according to the change in the carbon fiber is greatly affected by the physical quantity related to the carbon fiber, so it may be expected that the sensitivity index of the latter will derive a more accurate result in observing stiffness or damping change.

In addition, the result may be determined through the relationship between the structural stiffness and the viscous damping as will be described later. To this end, in the present disclosure, as a method of determining the relationship between the structural stiffness and the viscous damping coefficient of the carbon composite material, a plane graph of which the X-axis indicates the sensitivity index of either the structural stiffness or the viscous damping coefficient and the Y-axis indicates the sensitivity index of the other was used.

More specifically, on the basis of the two types of sensitivity index values as described above, the case of directly using the equivalent physical quantity and the case of using the physical quantity ratio based on the equation limited only to the carbon fiber are shown.

Figure 5:
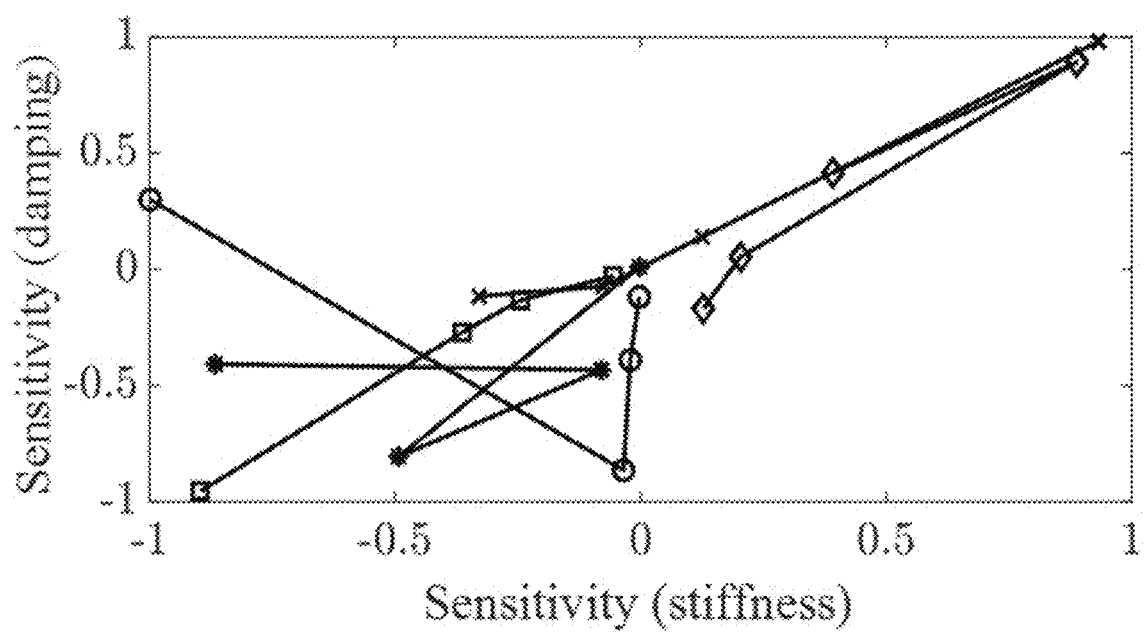
FIG. 5 is a graph illustrating a relationship between the structural stiffness and the viscous damping coefficient related to an equivalent physical quantity of a carbon composite material.
Figure 6:
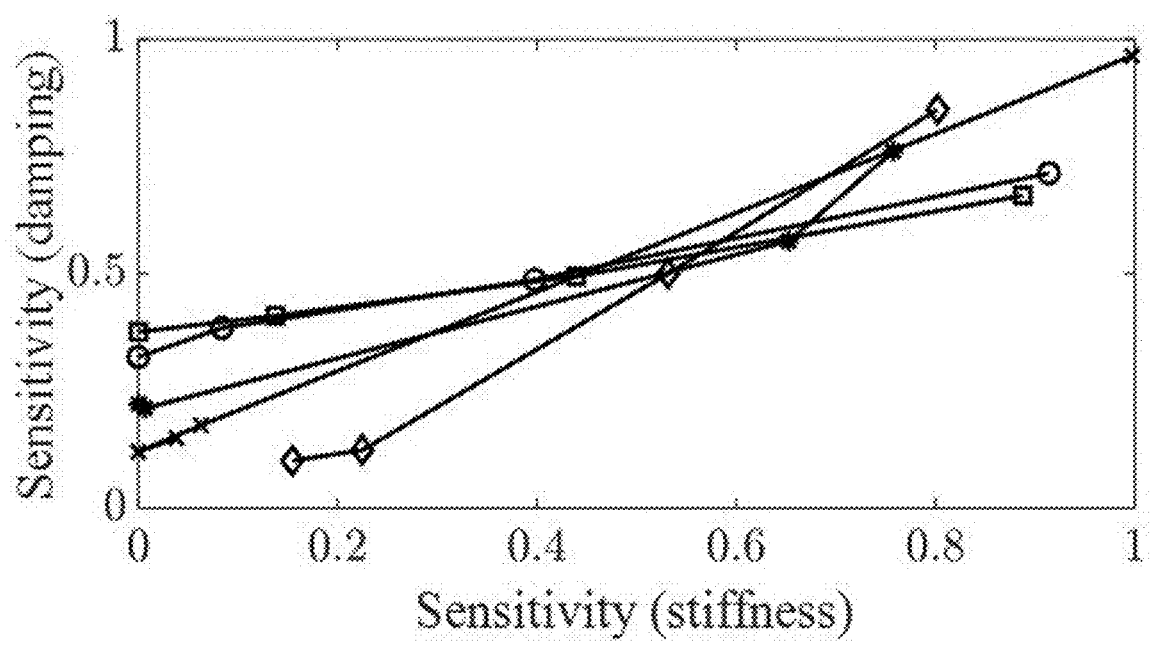
FIG. 6 is a graph illustrating a relation between the structural stiffness and the viscous damping coefficient limited only to the carbon fiber of a carbon composite material.

That is, referring to FIGS. 5 and 6, FIGS. 5 and 6 are diagrams illustrating the relationship between the structural stiffness and the viscous damping coefficient of the carbon composite material.

Herein, FIG. 5 is a diagram illustrating the relationship between the structural stiffness and the viscous damping coefficient related to the equivalent physical quantity. The first bending mode is denoted by -⊙-, the second bending mode is denoted by -✶-, the third bending mode is denoted by -◇-, the first twisting mode is denoted by -☐-, and the second twisting mode is denoted by -✶-.

In addition, FIG. 6 is a diagram illustrating the relationship between the structural stiffness and the viscous damping coefficient limited only to the carbon fiber. The first bending mode is denoted by -⊙-, the second bending mode is denoted by -✶-, the third bending mode is denoted by -◇-, the first twisting mode is denoted by -☐-, and the second twisting mode is denoted by -✶-.

As shown in FIG. 5, regarding the relationship between the structural stiffness and the viscous damping coefficient related to the equivalent physical quantity, it was found that although some modes showed a linear relationship, there were parts where it was difficult to define what relationship is shown, in other parts.

On the other hand, it was found that the relationship between the structural stiffness and the viscous damping coefficient limited only to the carbon fiber was linear in almost all modes as shown in FIG. 6.

Such a result is due to the characteristic of the viscous damping coefficient. That is, the damping coefficient related to the binder that does not change according to the direction of the carbon fiber has a parallel combination relationship with the damping coefficient of the carbon fiber, so the sensitivity index value of the equivalent physical quantity does not strictly represent the physical change.

Therefore, from the above-described details, it is found that the sensitivity indices shown in [Equation 5] and [Equation 6] in the present disclosure are sensitivity indices that more efficiently reflect the change in the structural stiffness and the viscous damping coefficient according to the change in the carbon fiber direction.

Furthermore, through the graph of which the X-axis and the Y-axis indicate the sensitivity index values related to stiffness and damping proposed in the present disclosure as described above, it may be intuitively determined that the respective physical quantities have a linear relationship. Therefore, the present disclosure improves the sensitivity index of the viscous damping coefficient limited to a carbon material proposed in the existing patent (Korean Patent Application No. 10-2021-0120284) previously filed by the inventor of the present disclosure. Simultaneously, the present disclosure proposes the sensitivity index related to structural stiffness, which is new, and the method of analyzing the relationship between the structural stiffness and the viscous damping coefficient through the plane graph. Accordingly, a more accurate analysis can be conducted using such sensitivity indices than an analysis of the dynamic characteristics of a carbon composite material.

Accordingly, from the above-described details, a method of calculating sensitivity indices for the structural stiffness and viscous damping coefficient of a carbon composite material according to an embodiment of the present disclosure can be easily realized. That is, referring to FIG. 7, FIG. 7 is a flowchart schematically illustrating an overall configuration of a method of calculating sensitivity indices for the structural stiffness and the viscous damping coefficient of the carbon composite material according to an embodiment of the present disclosure.

Figure 7:
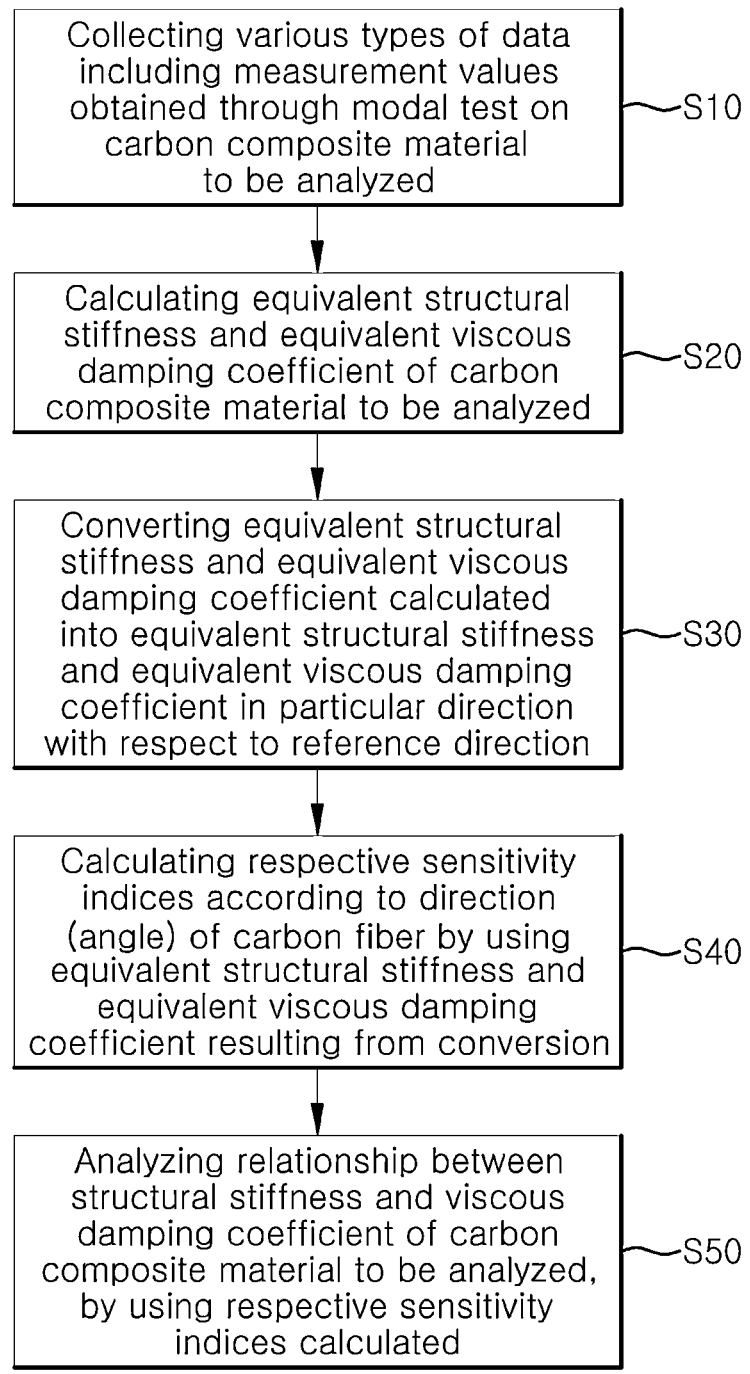
FIG. 7 is a flowchart schematically illustrating an overall configuration of a method of calculating sensitivity indices for the structural stiffness and the viscous damping coefficient of a carbon composite material according to an embodiment of the present disclosure.

As shown in FIG. 7, the method of calculating sensitivity indices for the structural stiffness and the viscous damping coefficient of a carbon composite material according to an embodiment of the present disclosure roughly includes the following processing process: a data collection step S10 of collecting various types of data including measurement values obtained through a modal test on the carbon composite material to be analyzed; an equivalent physical quantity calculation step S20 of calculating equivalent structural stiffness and an equivalent viscous damping coefficient of the carbon composite material to be analyzed, on the basis of the respective data collected at the data collection step S10; an equivalent physical quantity conversion step S30 of expressing the equivalent structural stiffness and the equivalent viscous damping coefficient calculated at the equivalent physical quantity calculation step S20 into equivalent structural stiffness and an equivalent viscous damping coefficient in a particular direction with respect to a reference direction; a sensitivity index calculation step S40 of calculating the respective sensitivity indices according to a direction (angle) of carbon fiber by using the equivalent structural stiffness and the equivalent viscous damping coefficient resulting from conversion at the equivalent physical quantity conversion step S30; and an analysis step S50 of analyzing a relationship between the structural stiffness and the viscous damping coefficient of the carbon composite material to be analyzed, by using the respective sensitivity indices calculated at the sensitivity index calculation step S40. The processing process is performed by a computer or dedicated hardware.

Herein, at the data collection step S10, the various types of the measurement values and the data including a resonance frequency, a modal damping ratio, and the viscous damping coefficient according to the direction (angle) of the carbon fiber are collected through a modal test on a carbon composite material, such as a carbon-fiber-reinforced plastic (CFRP), to be analyzed, or the measurement values previously measured are input through an input means.

In addition, at the equivalent physical quantity calculation step S20, on the basis of the respective data collected at the data collection step S10, the mass-normalized equivalent structural stiffness and the mass-normalized equivalent viscous damping coefficient of the carbon composite material to be analyzed are defined and expressed as in [Equation 1] and [Equation 2].

In addition, at the equivalent physical quantity conversion step S30, the equivalent structural stiffness and the equivalent viscous damping coefficient defined at the equivalent physical quantity calculation step S20 are expressed into the equivalent structural stiffness and the equivalent viscous damping coefficient in the particular direction with respect to the reference direction using [Equation 3] and [Equation 4].

In addition, at the sensitivity index calculation step S40, on the basis of the equivalent structural stiffness and the equivalent viscous damping coefficient resulting from conversion at the equivalent physical quantity conversion step S30, the sensitivity index for the structural stiffness according to the direction (angle) of the carbon fiber and the sensitivity index for the viscous damping coefficient according to the direction (angle) of the carbon fiber are calculated using [Equation 5] and [Equation 6].

In addition, at the analysis step S50, a proportional relationship between the sensitivity index for the structural stiffness and the sensitivity index for the viscous damping coefficient is analyzed. To this end, as described above with reference to FIG. 6, the proportional relationship between the sensitivity index for the structural stiffness and the sensitivity index for the viscous damping coefficient is analyzed through the graph of which the X-axis indicates either the sensitivity index for the structural stiffness or the sensitivity index for the viscous damping coefficient that are limited only to the carbon fiber and the Y-axis indicates the remaining sensitivity index.

In addition, a system for calculating sensitivity indices may be realized using the method of calculating the sensitivity indices for the structural stiffness and the viscous damping coefficient of the carbon composite material according to the embodiment of the present disclosure described above.

Figure 8:
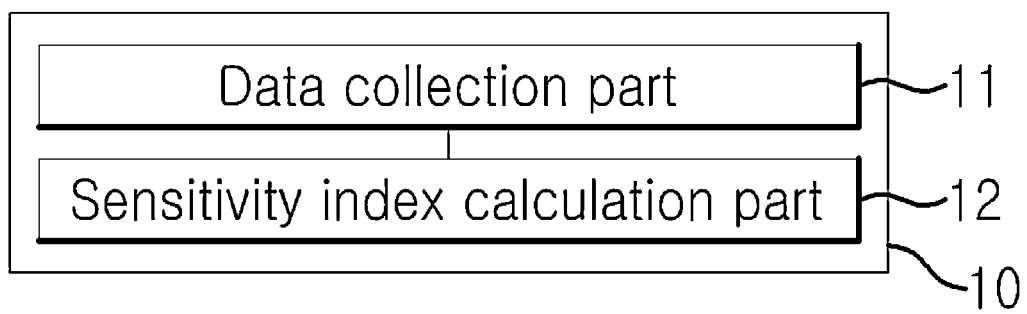
FIG. 8 is a block diagram schematically illustrating an overall configuration of a system for calculating sensitivity indices by using a method of calculating sensitivity indices for the structural stiffness and the viscous damping coefficient of a carbon composite material according to an embodiment of the present disclosure.

That is, referring to FIG. 8, FIG. 8 is a block diagram schematically illustrating an overall configuration of a system 10 for calculating sensitivity indices by using a method of calculating sensitivity indices for the structural stiffness and the viscous damping coefficient of a carbon composite material according to an embodiment of the present disclosure.

As shown in FIG. 8, the system 10 for calculating sensitivity indices by using the method of calculating sensitivity indices for the structural stiffness and the viscous damping coefficient of a carbon composite material according to an embodiment of present disclosure may roughly include a data collection part (or a data collection processor) 11 and a sensitivity index calculation part (or a sensitivity index calculation processor) 12. The data collection part 11 collects various types of data including measurement values obtained through a modal test on the carbon composite material to be analyzed. The sensitivity index calculation part 12 calculates, on the basis of the data collected through the data collection part 11, the respective sensitivity indices for the structural stiffness and the viscous damping coefficient of the carbon composite material to be analyzed, by using the above-described method of calculating the sensitivity indices for the structural stiffness and the viscous damping coefficient of the carbon composite material.

Accordingly, a method and a system for calculating sensitivity indices for the structural stiffness and the viscous damping coefficient of a carbon composite material according to an embodiment of the present disclosure are realized as described above. Using these, a method and a system for analyzing dynamic characteristics of a carbon composite material are easily realized.

Figure 9:
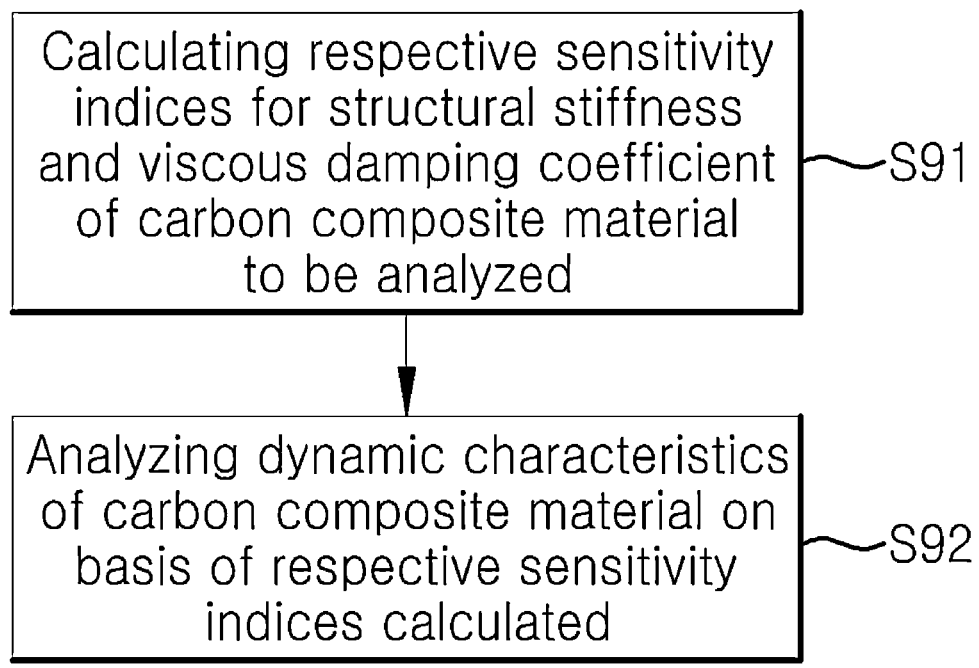
FIG. 9 is a flowchart schematically illustrating an overall configuration of a method of analyzing dynamic characteristics of a carbon composite material by using a method of calculating sensitivity indices for the structural stiffness and the viscous damping coefficient of the carbon composite material according to an embodiment of the present disclosure.
Figure 10:
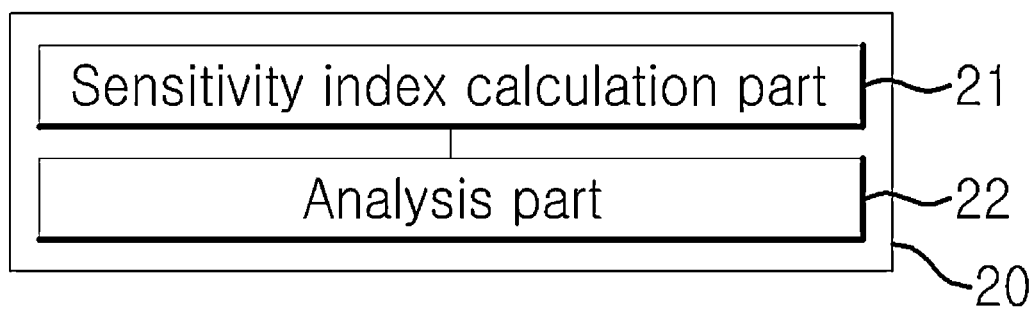
FIG. 10 is a block diagram schematically illustrating an overall configuration of a system for analyzing dynamic characteristics of a carbon composite material by using a method of calculating sensitivity indices for the structural stiffness and the viscous damping coefficient of the carbon composite material according to an embodiment of the present disclosure.

That is, referring to FIGS. 9 and 10, FIG. 9 is a flowchart schematically illustrating an overall configuration of a method of analyzing dynamic characteristics of a carbon composite material according to an embodiment of the present disclosure. FIG. 10 is a block diagram schematically illustrating an overall configuration of a system 20 for analyzing dynamic characteristics of a carbon composite material according to an embodiment of the present disclosure.

More specifically, as shown in FIG. 9, a method of analyzing dynamic characteristics of a carbon composite material according to an embodiment of the present disclosure roughly includes: a sensitivity index calculation step S91 of calculating respective sensitivity indices for structural stiffness and a viscous damping coefficient of the carbon composite material to be analyzed; and an analysis step S92 of analyzing the dynamic characteristics of the carbon composite material on the basis of the respective sensitivity indices calculated at the sensitivity index calculation step.

In addition, as shown in FIG. 10, the system 20 for analyzing dynamic characteristics of a carbon composite material according to an embodiment of the present disclosure roughly includes: a sensitivity index calculation part 21 configured to calculate respective sensitivity indices for structural stiffness and a viscous damping coefficient of the carbon composite material to be analyzed; and an analysis part 22 configured to analyze the dynamic characteristics of the carbon composite material on the basis of the respective sensitivity indices calculated by the sensitivity index calculation part.

Herein, the sensitivity index calculation step S91 and the sensitivity index calculation part 21 are configured to calculate the respective sensitivity indices for the structural stiffness and the viscous damping coefficient of the carbon composite material by using the above-described method of calculating the sensitivity indices for the structural stiffness and the viscous damping coefficient of the carbon composite material according to an embodiment of the present disclosure.

Accordingly, as described above, the method of calculating the sensitivity indices for the structural stiffness and the viscous damping coefficient of the carbon composite material according to an embodiment of the present disclosure and the method of analyzing the dynamic characteristics of the carbon composite material by using the same are realized. According to the present disclosure, provided are the method of calculating the sensitivity indices for the structural stiffness and the viscous damping coefficient of the carbon composite material and the method of analyzing the dynamic characteristics of the carbon composite material by using the same, wherein considering that carbon fiber is dominant in the structural stiffness of the carbon composite material and for the viscous damping coefficient, a change in the damping coefficient related to the carbon fiber greatly affects a change in the equivalent viscous damping of the carbon composite material, the respective sensitivity indices for the structural stiffness and the viscous damping coefficient for each mode according to a change in the carbon fiber direction are calculated. Accordingly, sensitivity indices that encompass both a change in a resonance point and a change in a damping coefficient observed as the carbon fiber changes while the sensitivity index values have a linear relationship can be proposed.

In addition, according to the present disclosure, provided are the method of calculating the sensitivity indices for the structural stiffness and the viscous damping coefficient of the carbon composite material and the method of analyzing the dynamic characteristics of the carbon composite material by using the same, wherein as described above, the respective sensitivity indices for the structural stiffness and the viscous damping coefficient according to the direction (angle) of the carbon fiber for the carbon composite material are calculated, so that sensitivity indices that encompass both a change in a resonance point and a change in a damping coefficient observed as the carbon fiber changes while the sensitivity index values have a linear relationship can be proposed. Accordingly, it is possible to solve the problem of the sensitivity index in the related art where there is a limitation in determining the degree of sensitivity because a sensitivity value does not change linearly and there is a limitation that it is impossible to determine the sensitivity to a change in resonance point varying according to the change in the carbon fiber.

In addition, according to the present disclosure, provided are the method of calculating the sensitivity indices for the structural stiffness and the viscous damping coefficient of the carbon composite material and the method of analyzing the dynamic characteristics of the carbon composite material by using the same, wherein as described above, by using the sensitivity indices for the structural stiffness and the viscous damping coefficient that encompass both a change in a resonance point and a change in a damping coefficient according to a change in the carbon fiber and have a linear relationship, a proportional relationship between the sensitivity indices is analyzed to evaluate a change in the dynamic characteristics of the carbon composite material. Accordingly, the dynamic characteristics of the carbon composite material can be analyzed more accurately and efficiently than in the conventional methods.

As described above, although a method of calculating sensitivity indices for the structural stiffness and the viscous damping coefficient of a carbon composite material and a method of analyzing dynamic characteristics of a carbon composite material by using the same according to an embodiment of the present disclosure have been described in detail, the present disclosure is not limited to the contents described in the above embodiments. Therefore, various modifications, changes, combinations, and substitutions of the present disclosure may be allowed to be changed by those skilled in the art according to a design need and other various factors changed.

What is claimed is:
1. A method of calculating sensitivity indices for structural stiffness and a viscous damping coefficient of a carbon composite material, using a computer or dedicated hardware, the method comprising:

collecting various types of data including measurement values obtained through a modal test on the carbon composite material to be analyzed;

calculating equivalent structural stiffness and an equivalent viscous damping coefficient of the carbon composite material to be analyzed, on the basis of the collected respective data;

converting the equivalent structural stiffness and the equivalent viscous damping coefficient into equivalent structural stiffness and an equivalent viscous damping coefficient in a particular direction with respect to a predetermined reference direction;

calculating the respective sensitivity indices according to a direction (angle) of carbon fiber by using the equivalent structural stiffness and the equivalent viscous damping coefficient resulting from the conversion; and analyzing a relationship between the structural stiffness and the viscous damping coefficient of the carbon composite material to be analyzed, by using the respective sensitivity indices.

2. The method of claim 1, wherein the various types of the measurement values and the data including a resonance frequency, a modal damping ratio, and the viscous damping coefficient according to the direction (angle) of the carbon fiber are collected through the modal test on the carbon composite material to be analyzed, or the measurement values and the data previously measured are input through an input means.

3. The method of claim 1, wherein the equivalent structural stiffness $\bar{k}_{eq,i}$ and the equivalent viscous damping coefficient $\bar{c}_{eq,i}$ normalized by a modal mass $m_i$ for each mode of the carbon composite material to be analyzed are expressed as respective equations for the carbon fiber and a binder using the following equations $$\bar{k}_{eq,i}(\theta_j) = (\omega_{n_i,C}(\theta_j))^2 + (\omega_{n_i,M}(\theta_j))^2 = \bar{k}_{C,i}(\theta_j) + \bar{k}_{M,i}(\theta_j)$$

$$\bar{c}_{eq,i}(\theta_j) = \left(\frac{1}{2\xi_{i,C}(\theta_j)\omega_{n_i,C}(\theta_j)} + \frac{1}{2\xi_{i,M}(\theta_j)\omega_{n_i,M}(\theta_j)}\right)^{-1} = \left(\frac{1}{\bar{c}_{C,i}(\theta_j)} + \frac{1}{\bar{c}_{M,i}(\theta_j)}\right)^{-1}$$

(where $\theta_1$ denotes a reference carbon fiber direction, $\theta_j$ denotes a particular carbon fiber angle, $\omega_n$ denotes a resonance frequency, $\xi$ denotes a modal damping ratio, c denotes the viscous damping coefficient).

4. The method of claim 1, wherein the equivalent structural stiffness and the equivalent viscous damping coefficient are expressed into the equivalent structural stiffness and the equivalent viscous damping coefficient in the particular direction with respect to the predetermined reference direction using following equations $$\frac{\bar{k}_{C,i}(\theta_j)}{\bar{k}_{C,i}(\theta_1)} = 1 - \frac{\bar{k}_{eq,i}(\theta_1) - \bar{k}_{eq,i}(\theta_j)}{\bar{k}_{eq,i}(\theta_1) - \bar{k}_{eq,i}(\theta_*)}$$

$$\frac{\bar{c}_{C,i}(\theta_j)}{\bar{c}_{C,i}(\theta_1)} \approx \frac{\bar{c}_{eq,i}(\theta_j)}{\bar{c}_{eq,i}(\theta_1)}$$

(where $\bar{k}_{eq,i}(\theta_1)$ denotes the structural stiffness at a reference angle, $\bar{k}_{eq,i}(\theta_j)$ denotes the structural stiffness at a particular angle, $\bar{k}_{eq,i}(\theta_*)$ denotes an equivalent structural stiffness condition with the lowest stiffness, $\bar{c}_{eq,i}(\theta_1)$ denotes the equivalent viscous damping coefficient at the reference angle, and $\bar{c}_{eq,i}(\theta_j)$ denotes the equivalent viscous damping coefficient at the particular angle).

5. The method of claim 1, wherein the sensitivity index for the structural stiffness according to the direction (angle) of the carbon fiber and the sensitivity index for the viscous damping coefficient according to the direction (angle) of the carbon fiber are calculated using following equations $$I_{C,k_i}(\theta_l) = \frac{1 - \frac{\bar{k}_{eq,1}(\theta_l) - \bar{k}_{eq,i}(\theta_l)}{\bar{k}_{C,i}(\theta_1)}}{\text{norm}\left\{\sum_{l=1}^{N}\left[1 - \frac{\bar{k}_{eq,1}(\theta_l) - \bar{k}_{eq,i}(\theta_l)}{\bar{k}_{C,i}(\theta_1)}\right]\right\}}$$

$$I_{C,c_i}(\theta_l) = \frac{\frac{\bar{c}_{eq,i}(\theta_l)}{\bar{c}_{eq,i}(\theta_1)}}{\text{norm}\left\{\sum_{l=1}^{N} = \left[\frac{\bar{c}_{eq,i}(\theta_l)}{\bar{c}_{eq,i}(\theta_1)}\right]\right\}}$$

6. The method of claim 1, wherein a proportional relationship between the sensitivity index for the structural stiffness and the sensitivity index for the viscous damping coefficient is analyzed through a graph of which the X-axis indicates either the sensitivity index for the structural stiffness or the sensitivity index for the viscous damping coefficient and the Y-axis indicates the remaining sensitivity index.

7. A system for calculating sensitivity indices for structural stiffness and a viscous damping coefficient of a carbon composite material, the system comprising:

a data collection processor configured to collect various types of data including measurement values obtained through a modal test on the carbon composite material to be analyzed; and a sensitivity index calculation processor configured to calculate the respective sensitivity indices for the structural stiffness and the viscous damping coefficient of the carbon composite material to be analyzed, on the basis of the collected data, wherein the sensitivity index calculation processor is configured to calculate the respective sensitivity indices for the structural stiffness and the viscous damping coefficient by using the method of claim 1.

8. A method of analyzing dynamic characteristics of a carbon composite material, the method comprising:

calculating respective sensitivity indices for structural stiffness and a viscous damping coefficient of the carbon composite material to be analyzed; and analyzing the dynamic characteristics of the carbon composite material to be analyzed, on the basis of the collected respective sensitivity indices, wherein the respective sensitivity indices for the structural stiffness and the viscous damping coefficient are calculated by using the method of claim 1.

9. A system for analyzing dynamic characteristics of a carbon composite material, the system comprising:

a sensitivity index calculation processor configured to calculate respective sensitivity indices for structural stiffness and a viscous damping coefficient of the carbon composite material to be analyzed; and an analysis processor configured to analyze the dynamic characteristics of the carbon composite material to be analyzed, on the basis of the respective sensitivity indices calculated by the sensitivity index calculation part, wherein the sensitivity index calculation processor is configured to calculate the respective sensitivity indices for the structural stiffness and the viscous damping coefficient by using the method of claim 1.

10. A non-transitory computer-readable recording medium storing instructions to perform a method of calculating sensitivity indices for structural stiffness and a viscous damping coefficient of a carbon composite material, using a computer or dedicated hardware, the method comprising:

collecting various types of data including measurement values obtained through a modal test on the carbon composite material to be analyzed;

calculating equivalent structural stiffness and an equivalent viscous damping coefficient of the carbon composite material to be analyzed, on the basis of the collected respective data;

converting the equivalent structural stiffness and the equivalent viscous damping coefficient into equivalent structural stiffness and an equivalent viscous damping coefficient in a particular direction with respect to a predetermined reference direction;

calculating the respective sensitivity indices according to a direction (angle) of carbon fiber by using the equivalent structural stiffness and the equivalent viscous damping coefficient resulting from the conversion; and analyzing a relationship between the structural stiffness and the viscous damping coefficient of the carbon composite material to be analyzed, by using the respective sensitivity indices.

* * * * *